United States Patent [19]

Kawamura

[11] Patent Number: 5,014,188
[45] Date of Patent: May 7, 1991

[54] CACHE MEMORY CONTROLLOR ASSOCIATED WITH MICROPROCESSOR

[75] Inventor: Eiji Kawamura, Tokyo, Japan

[73] Assignee: NEC Corporation, Tokyo, Japan

[21] Appl. No.: 337,004

[22] Filed: Apr. 12, 1989

[30] Foreign Application Priority Data

Apr. 12, 1988 [JP] Japan .................................. 63-90510

[51] Int. Cl.⁵ .......................................... G06F 13/28
[52] U.S. Cl. .............................. 364/200; 364/243.41;
364/232.9; 364/271
[58] Field of Search ... 364/200 MS File, 900 MS File

[56] References Cited

U.S. PATENT DOCUMENTS 4,910,656  3/1990  Scales, III et al. ................. 364/200
4,912,630  3/1990  Cochcroft, Jr. .................... 364/200
4,912,631  3/1990  Lloyd ................................. 364/200

Primary Examiner—Eddie P. Chan
Attorney, Agent, or Firm—Sughrue, Mion, Zinn, Macpeak & Seas

[57] ABSTRACT

A cache memory controllor according to the present invention sequentially checks into a controlling circuit to see whether or not data words accessed are memorized in a cache memory and has a combination of an address generating circuit and a strobe signal producing circuit for producing a plurality of strobe signals in the presence of a request signal for a burst transmission mode of operation, so that a microprocessor sequentially fetches the data words in the cache memory even if the cache memory does not cope with the nibble mode of operation.

11 Claims, 11 Drawing Sheets

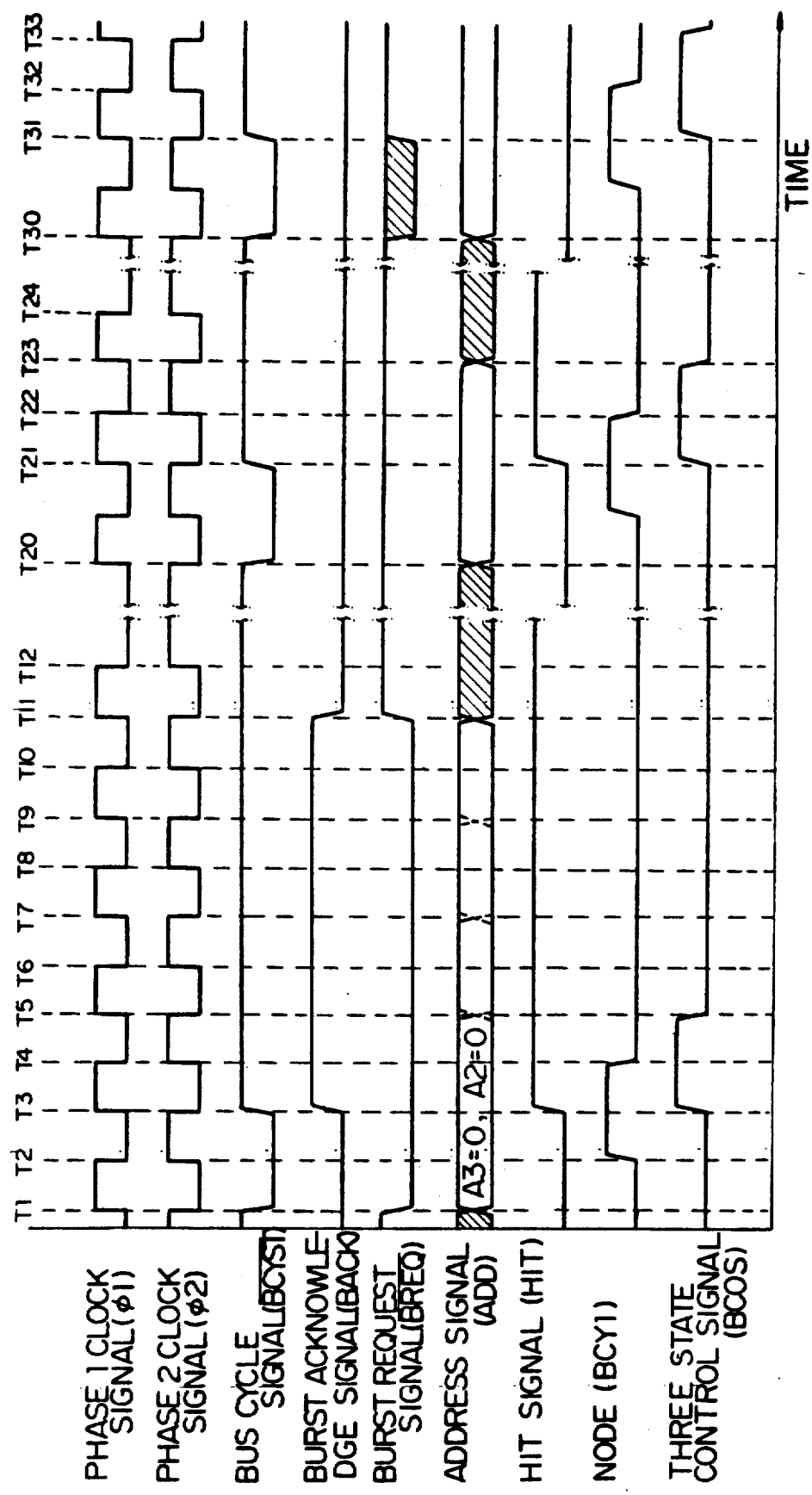

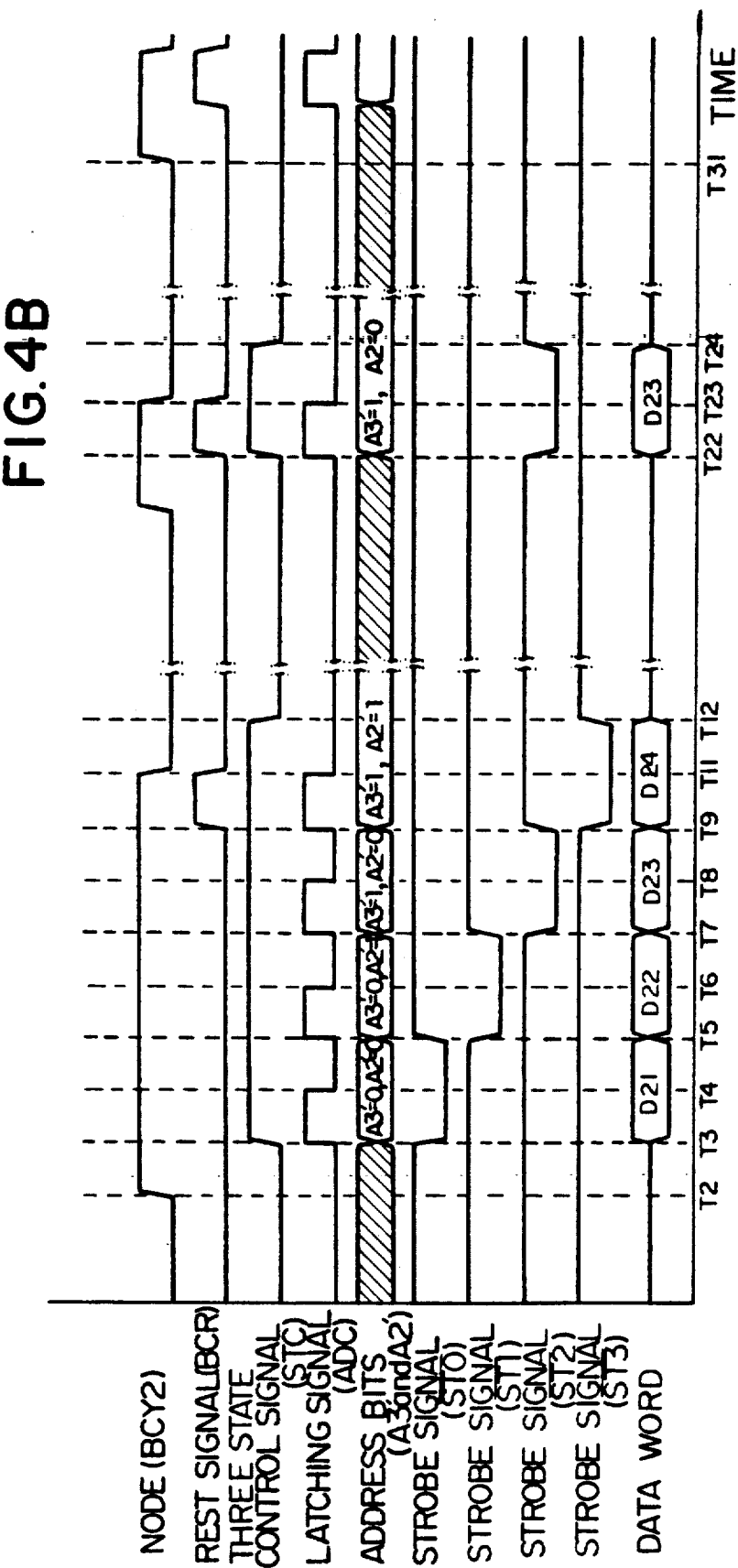

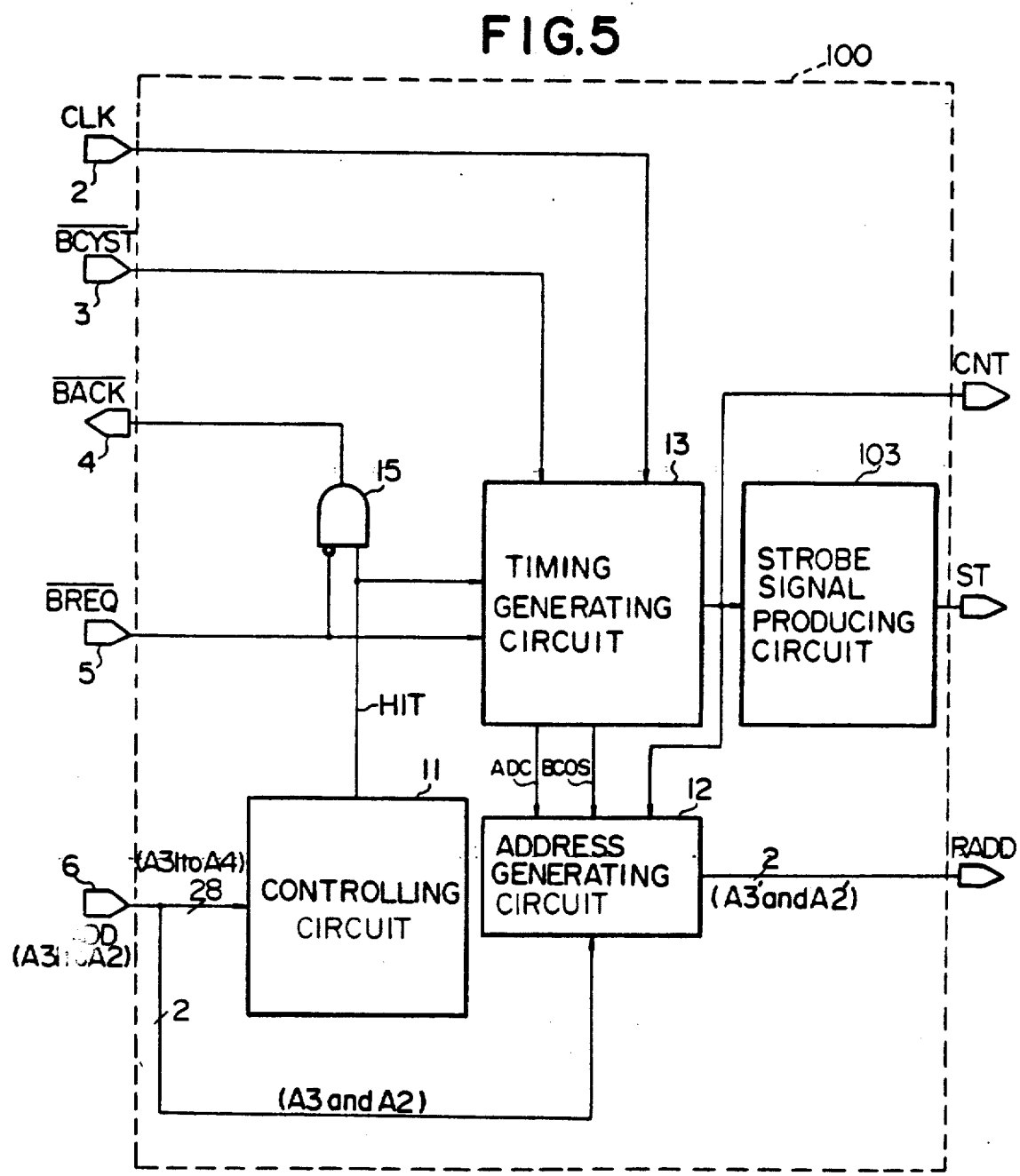

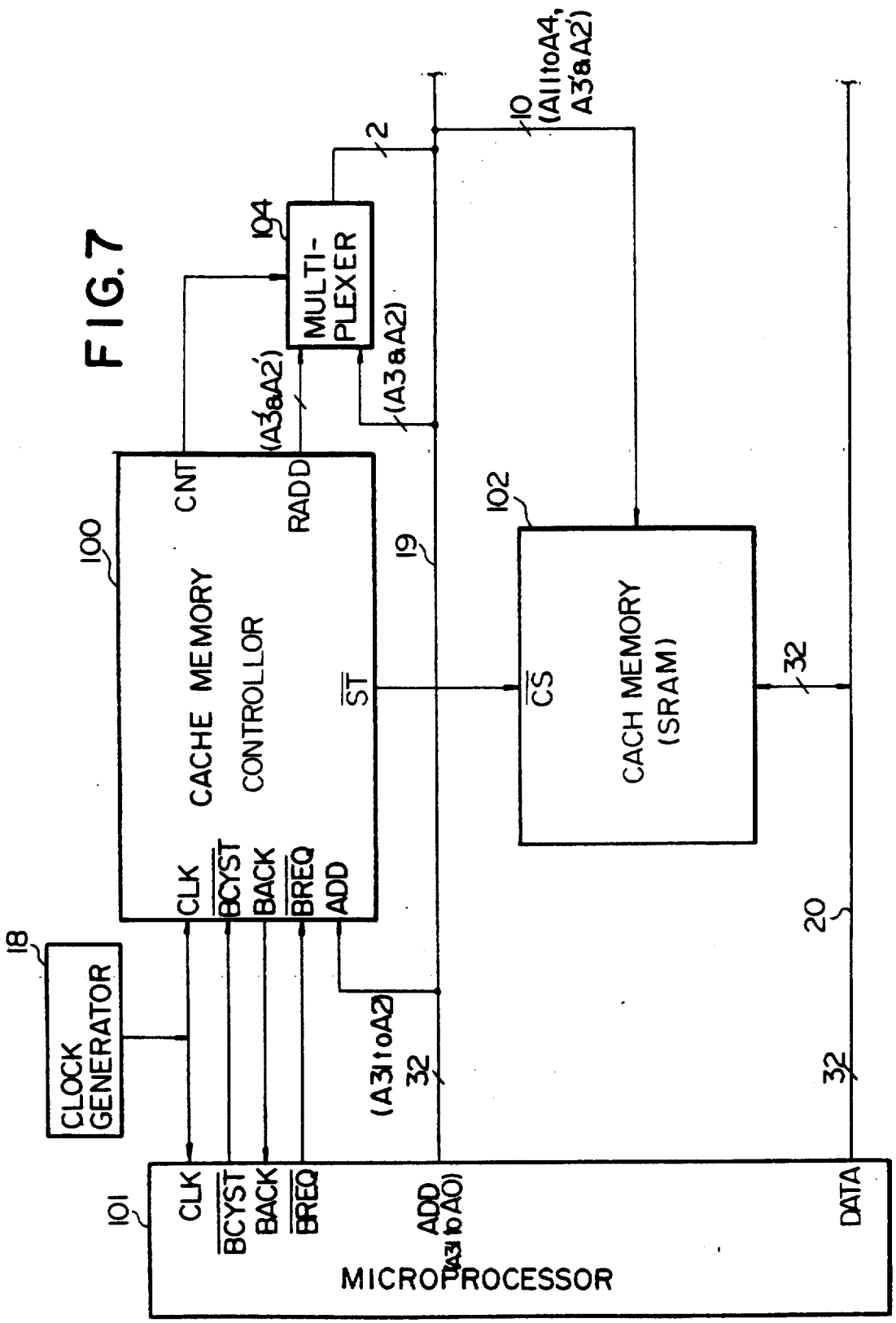

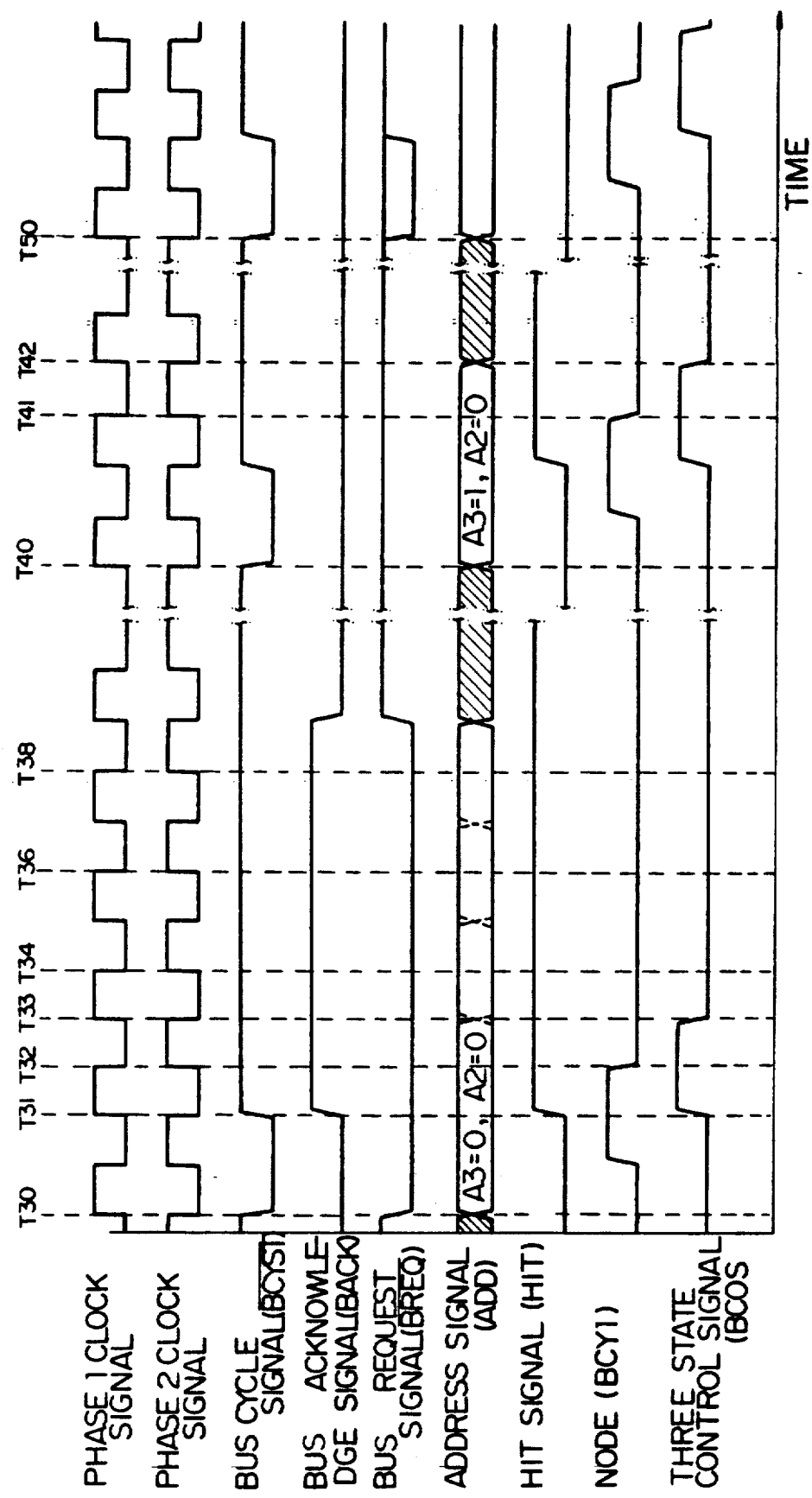

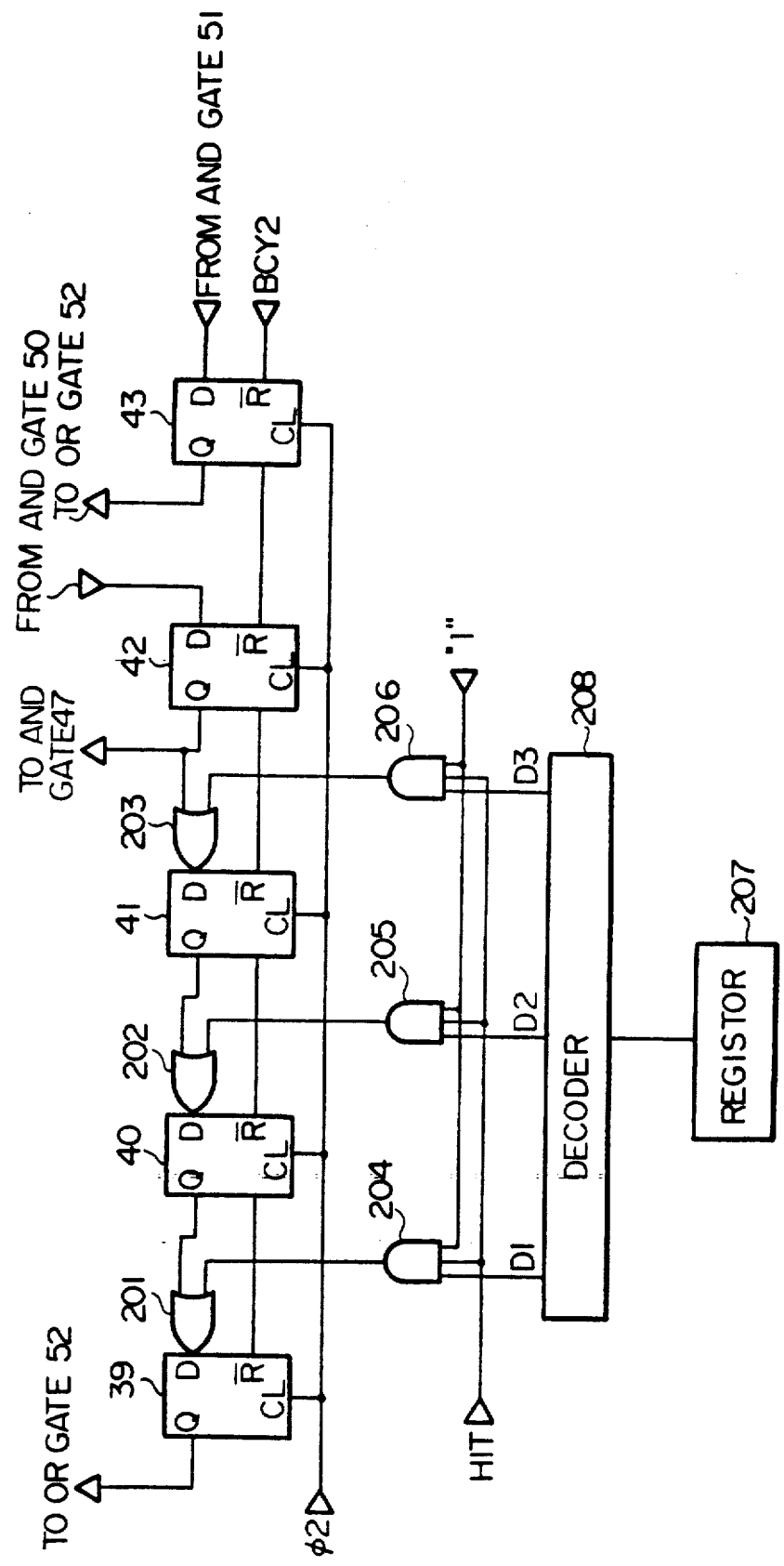

CACHE MEMORY CONTROLLER ASSOCIATED WITH MICROPROCESSOR

FIELD OF THE INVENTION

This invention relates to a data processing system and, more particularly, to a cache memory controllor provided in association with a microprocessor for enabling the microprocessor to establish a burst mode of access for a cache memory.

DESCRIPTION OF THE RELATED ART

A microprocessor has been improved in capability, and some microprocessor are capable of access to memory systems in both discrete and consecutive fashions. The consecutive access is hereinunder referred to as "burst transmission", and each burst transmission is assumed to occupy a single "burst bus cycle".

In a discrete access, the microprocessor fetches a single data word during a single bus cycle, and the single bus cycle consumes two clock cycles. If four data words are by way of example transferred in the discrete access, eight clock cycles are consumed for the transmission. However, the microprocessor fetches a plurality of, typically four, data words during a single burst bus cycle, and two clock cycles are consumed for the transmission of the first data word, but only three clock cycles are merely consumed for the second to fourth data words. As a result, the burst bus cycle merely consumes the five clock cycles for the transmission of the four data words and is economical rather than the discrete access in view of the amount of time consumed.

The burst transmission is applied to a data swapping in a built-in cache memory incorporated in a microprocessor. The cache memory is usually divided into a plurality of memory blocks, and each memory block in the built-in cache memory is sub-divided into, for example, four sub-blocks. If the discrete access is established in the microprocessor, all of the data words in the memory block are not swapped in succession, but only one sub-block is accessed for swapping the data word. On the other hand, when the burst transmission is established in the microprocessor, all of the data words are swapped from all of the sub-blocks in each memory block, so that the time period for the data swapping is drastically shrunk, and the hit ratio is improved with the frequent data swapping operation. This in turn results in improvement in throughput of the microprocessor. In this data processing system, if the cache memory is formed by dynamic random access memory devices, the dynamic random access memory devices are usually accessible in the nibble mode to cope with the burst transmission. Thus, the built-in type cache memory is advantageous in data processing speed, however, a problem is encountered in a relatively small memory capacity.

The cache memory is further applicable to a data processing system associated with a microprocessor without any internal cache memory. In this application, the cache memory is provided outside the microprocessor and, accordingly, coupled to the microprocessor. The external cache memory is designed for the discrete access occupying two clock cycles and, for this reason, hardly accessed with a single clock cycle for the data fetch. In other words, the external cache memory is not accessible in the burst transmission mode. Moreover, the external cache memory is formed by static random access memory devices which are not accessible in the nibble mode of operation. In this situation, the external cache memory should be accessed in the discrete access mode rather than the burst transmission mode. This results in a problem in that a relatively long time period is consumed for the swapping the data words.

SUMMARY OF THE INVENTION

It is therefore an important object of the present invention to provide a cache memory controllor which enable a microprocessor to access an external cache memory in the burst transmission mode.

To accomplish these objects, the present invention proposes to sequentially produce strobe signals for activation of the cache memory.

In accordance with one aspect of the present invention, there is provided a cache memory controller used in a data processing system including a cache memory provided with a plurality of memory devices, a main memory and a data processing unit providing an external address partially to the cache memory and partly to the cache memory controllor, the cache memory controllor being selectively shifted in a burst transmission mode, a discrete transmission mode and a swapping mode, comprising: (a) a controlling circuit supplied with high-order bits of the external address signal fed from the data processing unit and producing a hit signal when data words stored in respective addresses partially represented by the high-order bits are memorized in the cache memory, the controlling circuit further being shifted into the swapping mode so as to swap data words between the main memory and the cache memory if the data words are not memorized in the cache memory; (b) an address generating circuit storing low-order bits of the external address signal in the presence of a first activation signal and producing internal address bits indicative of one of the memory devices in the discrete transmission mode, the internal address bits being incremented in value in the presence of a second activation signal in the burst transmission mode so as to sequentially indicate the memory chips; (c) a strobe signal producing circuit responsive to the second activation signal and producing a single strobe signal on the basis of the internal address bits for activating one of the memory devices in the discrete transmission mode, the strobe signal producing circuit sequentially producing strobe signals on the basis of the internal address bits incremented in value in the presence of the second activation signal for activating the memory devices in succession; and (d) a timing generating circuit producing the first activation signal in the presence of the hit signal and a bus cycle signal, the timing generating circuit further producing the second activation signal in the presence of the bus cycle signal, the second activation signal being maintained for a predetermined time period in the presence of a request signal for the burst transmission mode fed from the data processing unit for allowing the internal address bits to be incremented in value.

In accordance with another aspect of the present invention, there is provided cache memory controllor used in a data processing system including a cache memory provided with a plurality of memory devices, a main memory and a data processing unit providing an external address partially to the cache memory and partly to the cache memory controllor, the cache memory controllor being selectively shifted in a burst transmission mode, a discrete transmission mode and a swapping mode, comprising: (a) a controlling circuit supplied with high-order bits of the external address signal fed from the data processing unit and producing a hit signal when data words stored in respective addresses partially represented by the high-order bits are memorized in the cache memory, the controlling circuit further being shifted into the swapping mode so as to swap data words between the main memory and the cache memory if the data words are not memorized in the cache memory; (b) an address generating circuit storing low-order bits of the external address signal in the presence of a first activation signal and producing internal address bits indicative of one of the address together with a part of the external address signal signal fed to the cache memory in the discrete transmission mode, the internal address bits being incremented in value in the presence of a second activation signal in the burst transmission mode so as to sequentially indicate the addresses together with the part of the external address signal; (c) a strobe signal producing circuit responsive to the second activation signal and producing a strobe signal in the presence of a bus cycle signal for reading out one of the data words in the discrete transmission mode, the strobe signal producing circuit maintaining the strobe signal on the basis of the internal address bits incremented in value in the presence of the second activation signal for reading out the data words in succession; and (d) a timing generating circuit producing the first activation signal in the presence of the hit signal and a bus cycle signal, the timing generating circuit further producing the second activation signal in the presence of the bus cycle signal, the second activation signal being maintained for a predetermined time period in the presence of a request signal for the burst transmission mode fed from the data processing unit for allowing the internal address bits to be incremented in value.

BRIEF DESCRIPTION OF THE DRAWINGS

The features and advantages of a cache memory controllor according to the present invention will be more clearly understood from the following description taken in conjunction with the accompanying drawings in which:

FIGS. 4A and 4B are diagrams showing the waveforms of signals produced in the data processing system shown in FIG. 2;

FIG. 5 is a block diagram showing the arrangement of another cache memory controllor embodying the present invention;

FIG. 7 is a block diagram showing the arrangement of a data processing system where the cache memory controller shown in FIG. 5 is incorporated;

FIGS. 8A and 8B are diagrams showing the waveforms of signals produced in the data processing system shown in FIG. 7; and FIG. 9 is a block diagram showing the arrangement of a part of a timing generating circuit incorporated in still another cache memory controllor according to the present invention.

DESCRIPTION OF THE PREFERRED EMBODIMENTS

First embodiment

Figure 1:
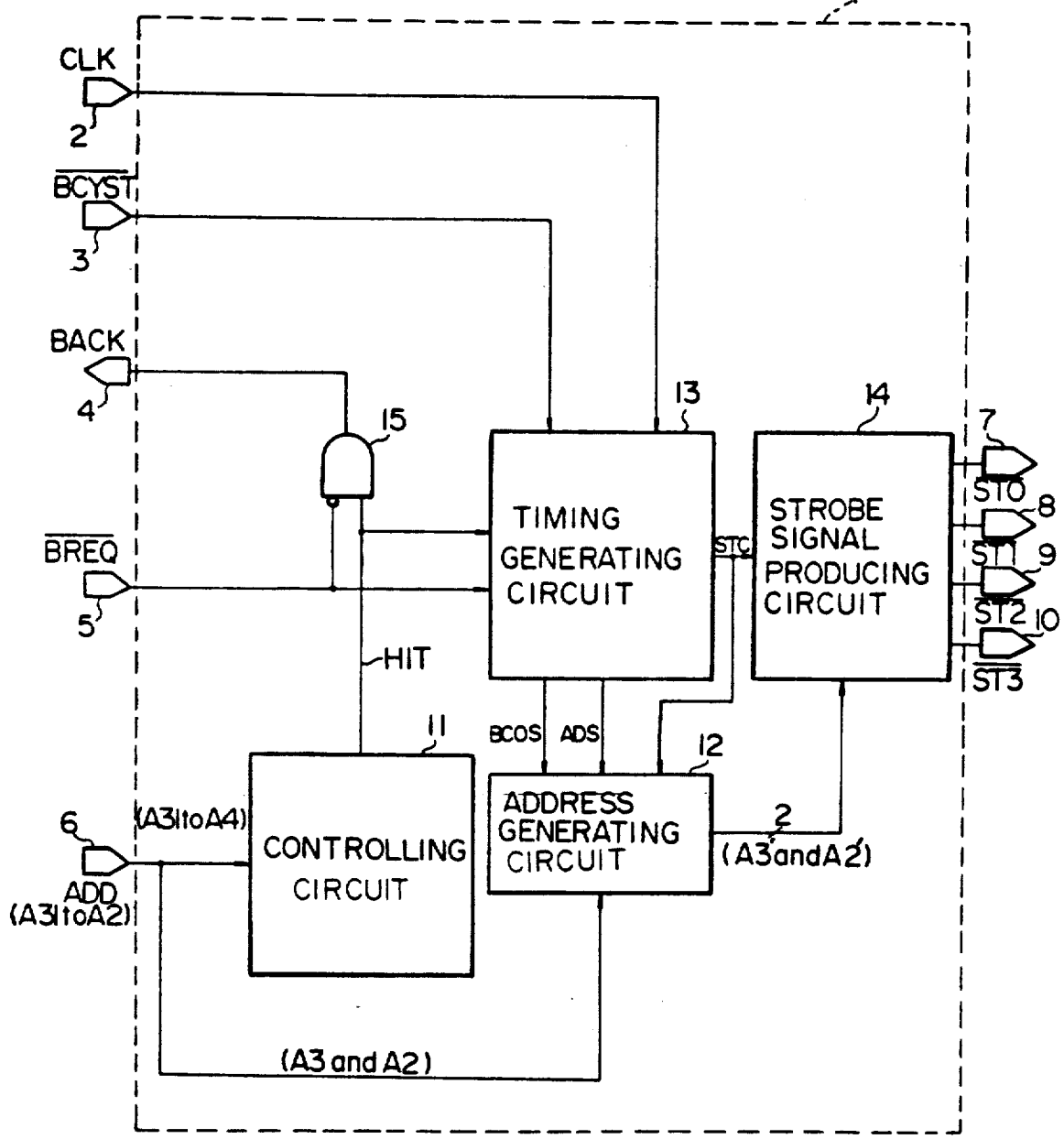
FIG. 1 is a block diagram showing the circuit arrangement of a cache memory controllor embodying the present invention.

Referring first to FIG. 1 of the drawings, a cache memory controllor 1 according to the present invention is accompanied with a plurality of terminals, i.e., a clock terminal 2 for a system clock signal CLK, a set of control terminals 3. 4 and 5 for a bus cycle signal BCYST of an active low voltage level, a burst request signal BREQ of the active low voltage level and a burst acknowledge signal BACK of an active high voltage level, respectively, a set of address terminals 6 for a multiple-bit external address ADD, and a set of output terminals 7, 8, 9 and 10 for strobe signals ST0, ST1, ST2 and ST3 of active low voltage level. The cache memory controllor 1 comprises a controlling circuit 11, an address generating circuit 12, a timing generating circuit 13, a strobe signal producing circuit 14, and a logic gate 15, and these component circuits except for the controlling circuit 11 are described in detail with reference to FIG. 3.

The bus cycle signal BCYST is supplied from, for example, a 32-bit microprocessor 16 (see FIG. 2) before a transmission of the external address signal ADD, and the external address signal ADD consists of 32 bits A31 to A0. The bits A31 to A2 are applied to the address terminals, and the high-order 30 bits A31 to A4 in turn are transferred to the controlling circuit 11. With the high-order 30 bits A31 to A4 of the external address signal ADD, the controlling circuit 11 checks into an internal address table thereof to see whether or not data words requested by the microprocessor 16 are stored in a cache memory 17 (see FIG. 2), and achieves a data swapping between the cache memory and a main memory (not shown) if the requested data words are not stored in the cache memory 17. On the other hand, if the requested data words have been stored in the cache memory 17, the controlling circuit 11 produces a hit signal HIT of the active high voltage level, and the hit signal HIT is supplied to the logic gate 15. The arrangement and the circuit behavior of the controlling circuit 11 are well known in the art, and, for this reason, no further description is incorporated in the following description.

The burst request signal BREQ is fed from the microprocessor 16 to the control terminal 5 and is indicative of a request of the burst transmission. When the microprocessor 16 tries to access the data words stored in the cache memory 17 in the burst transmission mode, the burst request signal BREQ is fed to the control terminal 5 which in turn transfers the burst request signal BREQ in parallel to the logic gate 15 and the timing generating circuit 13. The burst request signal BREQ is inverted before the logic gate 15, so that the complementary burst request signal of the high voltage level is supplied to the logic gate 15 in the presence of the burst request signal BREQ of the active low voltage level. When the data words requested by the microprocessor 16 are stored in the cache memory 17, the high signal HIT of the active high voltage level was supplied to the logic gate 15, so that the burst acknowledge signal BACK of the active high voltage level is produced by the logic gate 15 in the presence of the burst request signal BREQ and transferred to the microprocessor 16. In this situation, the timing generating circuit 13 is responsive to the hit signal HIT, the burst request signal BREQ, the bus cycle signal BCYST and the system clock signal CLK to produce timing signals for achieving the burst transmission. Some of these timing signals such as a latching signal ADS and a three state control signal BCOS are supplied to the address generating circuit 12, and the low-order 2 bits A2 and A3 are transferred from the address terminals 6 to the address generating circuit 12 for storing in response to the three state control signal BCOS. With the latching signal ADS, the address generating circuit 12 increments the value represented by the low-order 2 bits A2 and A3 at respective predetermined timings, so that a 2-bit increment signal A2' and A3' is supplied to the strobe signal producing circuit 14. Another three state control signal STC is fed from the timing generating circuit 13 to the strobe signal producing circuit 14, and the strobe signal producing circuit 14 sequentially produces the strobe signals ST0 to ST3 in the presence of the increment signal A2' and A3'.

Figure 2:
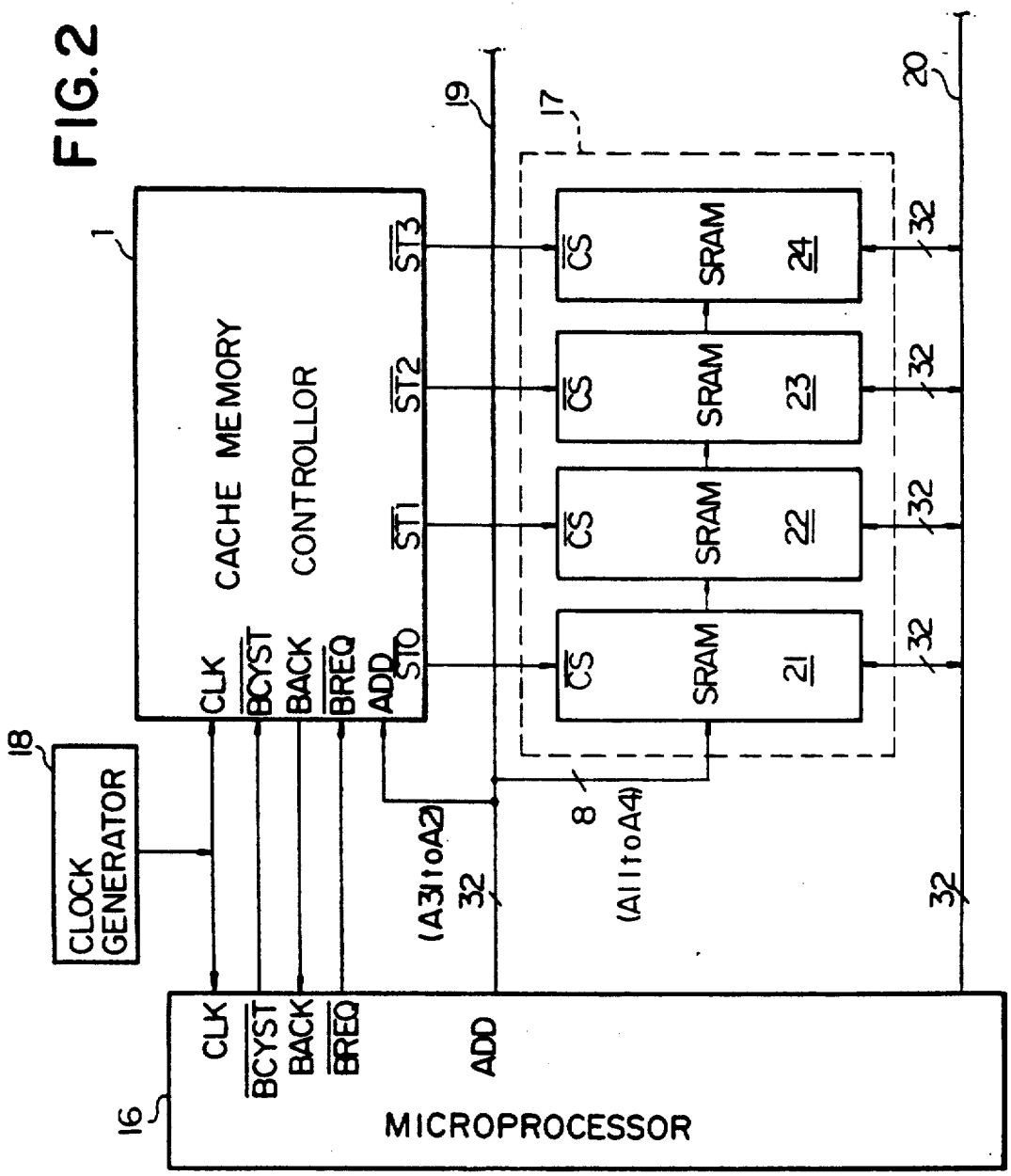
FIG. 2 is a block diagram showing the circuit arrangement of a data processing system equipped with the cache memory controllor shown in FIG. 1.

The cache memory controllor 1 thus arranged forms part of a data processing system as shown in FIG. 2. Referring to FIG. 2 of the drawings, the cache memory controllor 1 is provided in association with the microprocessor as well as the cache memory 17, and a clock generator 18 is coupled to the clock terminals of both controllor 1 and the microprocessor 16 for providing the system clock signal CLK. An address bus 19 is shared by the microprocessor 16, the cache memory controllor 1 and the cache memory 17, however, a data bus 20 is provided for a communication between the microprocessor 16 and the cache memory 17. The middle-order 8 bits A11 to A4 of the address signal ADD are supplied to the cache memory 17, and 32-bit data words are read out from the cache memory 17 to the data bus 20. In this instance, the cache memory 17 is provided with four static-type random access memory devices 21, 22, 23 and 24 which are accessible in the discrete mode only. Each of the static-type random access memory devices 21 to 24 stores a data word of 4 bites or 32 bits per address, and, for this reason, the cache memory 17 is capable of memorizing four data words. The output terminals 8 to 10 are respectively coupled at the chip select terminals CS thereof to the static-type random access memory devices 21 to 24 for transferring the strobe signals ST0 to ST3. Namely, when a data fetch is hit, the data word requested by the microprocessor 16 and the related three data words are successively read out from the cache memory 17 in response to the strobe signals ST0 to ST3. Though not shown in the drawings, the cache memory 17 is provided in association with a main memory, and the 20 bits A31 to A12 of the address signal ADD are supplied to the main memory 17 for detecting the address field the data words of which are stored in the cache memory 17. For this reason, the microprocessor 16 accesses the cache memory 17 with the address bits A11 to A4 of the external address signal ADD.

Figure 3:
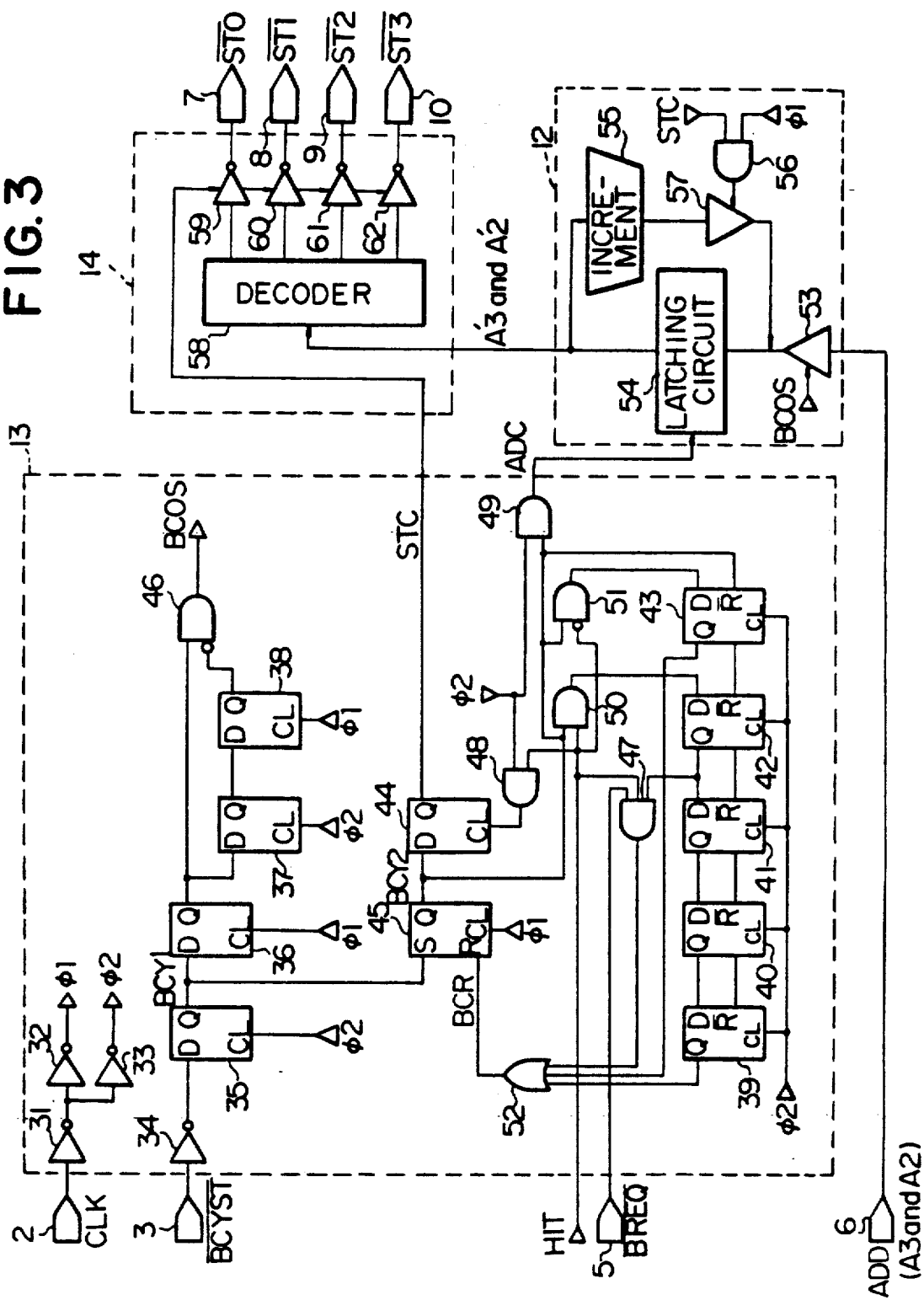
FIG. 3 is a block diagram showing the circuit arrangement of an essential part of the cache memory controllor shown in FIG. 1.

Description will be made in detail for the essential part of the cache memory controllor 1 with reference to FIG. 3 of the drawings. The timing generating circuit 13 comprises four inverter circuits 31, 32, 33 and 34 and 10 delay flip flop circuits 35, 36, 37, 38, 39, 40, 41, 42, 43 and 44, a single clocked R-S flip flop circuit 45, six AND gates 46, 47, 48, 49, 50 and 51, and a single OR gate 52. A node BCY1 is provided between the delay flip flop circuits 35 and 36, and another node BCY2 is provided between the clocked R-S flip flop circuit 45 and the delay flip flop circuit 44. These nodes BCY1 and BCY2 will be hereinunder used in description for the circuit behavior. The inverter circuits 31 and 32 are coupled in series and produce a phase 1 clock signal (phi 1) identical in phase with the system clock signal CLK, and the inverter circuit 33 is coupled in parallel to the inverter circuit 31 to produce a phase 2 clock signal (phi 2) complementarily altering with respect to the phase 1 clock signal. The bus cycle signal BCYST is supplied to the inverter circuit 34, and the delay flip flop circuits 35 and 36 successively propagate the bus cycle signal BCYST to one input node of the AND gate 46 in synchronization with the phase 1 and phase 2 clock signals, respectively. The bus cycle signal BCYST is further relayed from the delay flip flop circuit 36 through the delay flip flop circuits 37 to the other input node of the AND gate 46, so that the AND gate 46 shifts the three state control signal BCOS to the active high voltage level for a predetermined time period. The bus cycle signal BCYST is further transferred from the delay flip flop circuit 35 to a series combination of the clocked R-S flip flop circuit 45 and the delay flip flop circuit 44, and the three state control signal STC is produced by the delay flip flop circuit 44 and transferred to the strobe signal producing circuit 14.

A series combination of the delay flip flop circuits 42, 41, 40 and 39, the delay flip flop circuit 43 as well as the AND gates 47, 48, 50 and 51 are provided for producing internal timing signals in the co-presence of the hit signal HIT and the burst request signal BREQ, and the AND gate 49 produces the the latching signal ADS for latching the bits A2 and A3 in the address generating circuit 12. The OR gate is coupled to the rest node R of the clocked R-S flip flop circuit 45 and produces a reset signal BCR so as to recover the three state control signal STC to the inactive low voltage level.

The address generating circuit 12 comprises a three state buffer circuit 53 for the address bits A3 and A2, a latching circuit 54 coupled to the three-state buffer circuit 53, and a combination of an increment circuit 55, an AND gate 56 and a three state buffer circuit 57 for incrementing an address represented by the address bits A2' and A3'. The address generating circuit 12 thus arranged is operative to produce the address signal consisting of A2' and A3' incremented in sybchronization with the phase 1 clock signal.

The strobe signal producing circuit 14 comprises a decoder circuit 58 accompanied with four three combinations of state buffer circuits and inverter circuits 59, 60, 61 and 62. However, the three combinations are simply referred to as "three state buffer circuits" in the following description. The address signal consisting of the bits A2' and A3' is supplied to the decoder circuit 58 for producing the strobe signal, and the strobe signal is stored in the three state buffer circuits 59 to 62 in the presence of the three state control signal STC. The address signal consisting of the bits A2' and A3' is incremented in synchronization with the phase 1 clock signal, so that the strobe signals ST0 to ST3 are sequentially supplied from the strobe signal producing circuit 14 to the output terminals 7. to 10, respectively. The address bits A2' and A3' are decoded as follows.

TABLE 1

| A3' | A2' | Output 7 | Output 8 | Output 9 | Output 10 |
|---|---|---|---|---|---|
| 0 | 0 | 1 | 0 | 0 | 0 |

TABLE 1-continued

| A3' | A2' | Output 7 | Output 8 | Output 9 | Output 10 |
|---|---|---|---|---|---|
| 0 | 1 | 0 | 1 | 0 | 0 |
| 1 | 0 | 0 | 0 | 1 | 0 |
| 1 | 1 | 0 | 0 | 0 | 1 |

Description will be hereinunder made for operation of the data processing system with reference to FIGS. 4A and 4B. In the following description, logic "1" level is assumed to be tantamount to the high voltage level. The microprocessor 16 shifts the bus cycle signal BCYST to the active low voltage level at time T1 and delivers the address signal ADD to the address bus 19. The bus cycle signal BCYST remain in the active low voltage level during a single pulse width (from Time T1 to Time T3). The flip flop circuits 35 to 38 as well as the AND gate 46 cooperate and produce the three state control signal BCOS of the active high voltage level from time T3 to time T5. In the production of the three state control signal BCOS, the node BCY1 goes up to the high voltage level at time T2 and remains in the high voltage level until time T4. The clocked R-S flip flop circuit 45 stores the set signal S of logic "1" level at the leading end of the phase 1 clock signal to produce the output signal Q of the high voltage level, however, if the reset signal R is logic 1 level, the flip flop circuit 45 memorizes the reset signal R of the high voltage level at the leading end of the phase 1 clock signal. Whenever both of the set and reset signals S and R are in the low voltage level, the clocked R-S flip flop circuit 45 maintains the previous state even if the phase 1 clock signal is supplied thereto. The clocked R-S flip flop circuit 45 thus arranged is responsive to the high voltage level at the node BCY1 and memorizes the high voltage level at the leading edge of the phase 1 clock signal at time T3.

At time T1, the microprocessor 16 further shifts the burst request signal BREQ to the active low voltage level, and the controlling circuit 11 checks the internal address table thereof to see whether or not a data word stored fetched by the microprocessor 16 is memorized in the cache memory 17. If the data word is stored in the cache memory 17, the controlling circuit 11 shifts the hit signal HIT to the active high voltage level at time T3, and the AND gate 15 produces the burst acknowledge signal BACK in the presence of the burst request signal BREQ of the active low voltage level, and the burst acknowledge signal BACK is transferred to the microprocessor 16 at time T3. With the burst acknowledge signal BACK, the microprocessor 16 decides that the cache memory controllor 1 can support the burst transmission and, accordingly, fixes the high-order 28 bits A31 to A4 of the address signal ADD until the completion of the burst transmission. Since the AND gate 50 is supplied with the high voltage level at the node BCY2 as well as the hit signal HIT of the active high voltage level, the high voltage level is supplied to the delay flip flop circuit 42. The delay flip flop circuit 42 produces the high voltage level which is supplied to the AND gate 47 together with the hit signal HIT of the active high voltage level. However, the burst request signal BREQ of the active low voltage level restricts the AND gate 47, and, for this reason, no reset signal BCR is supplied from the OR gate 52 to the clocked R-S flip flop circuit 45. In other words, whenever the data fetch by the microprocessor 16 is hit, the AND gates 47 and 51 remain in the close state, and, accordingly, the delay flip flop circuit 43 keeps the output signal Q low. However, the delay flip flop circuit 42 shifts the output signal Q thereof into the high voltage level in the presence of the phase 2 clock signal, and the delay flip flop circuits 41, 40 and 39 propagate the output signal Q of the high voltage level in synchronization with the phase 2 clock signal. Then, the delay flip flop circuit 39 produces the output signal Q of the high voltage level at time T10. With the output signal Q of the high voltage level, the OR gate 52 yields the reset signal BCR of the high voltage level at time T10, and the clocked R-S flip flop circuit 45 recovers the node BCY2 to the low voltage level at time T11. The AND gate 48 produces the high voltage level in the presence of the phase 2 clock signal, and the delay flip flop circuit 44 recovers the three state control signal STC to the inactive low voltage level at time T12.

As described hereinbefore, the node BCY2 goes up to the high voltage level at time T3, so that the AND gate 49 yields the latching signal ADC at time T4 in synchronization with the phase 2 clock signal. The three state control signal BCOS was shifted to the active high voltage level at time T3 and allows the three state buffer circuit 53 to enter the low impedance state, so that the address bits A3 and A2 of logic "0" level are retained in the buffer circuit 53. The address bits A3 and A2 are further transferred to the latching circuit 54 in synchronization with the latching signal ADC of the active high voltage level at time T4, and, then, the address bits A3' and A2' of logic "0" level are supplied from the latching circuit 54 to the decoder circuit 58. The hit signal HIT was shifted to the high voltage level at time T3, so that the AND gate 48 supplies the delay flip flop circuit 44 with the high voltage level in the presence of the phase 2 clock signal at time T4. This results in that the delay flip flop circuit 44 latches the high voltage level at the node BCY2 and shifts the three state control signal STC into the active high voltage level. Thus, the three state control signal STC is supplied to the three state buffer circuits 59 to 62 and allows the three state buffer circuits 59 to 62 to enter the low impedance state, so that the three state buffer circuits 59 stores logic "1" level, however, the other three state buffer circuits 60 to 62 remain in logic "0" level. As a result, the strobe signal ST0 of the active low voltage level is transferred from the output terminal 7 to the static-type random access memory device 21, however, the other strobe signals ST1 to ST3 remain in the inactive high voltage level. The address bits A3' and A2' are supplied in parallel to the incrementing circuit 55 which increments the address bits by one.

With the strobe signal ST0, the data word D21 specified by the address signal is read out from the static-type random access memory device 21 to the data bus 20 at time T4, and the microprocessor 16 fetches the data word D21 at time T5, because the microprocessor 16 has been supplied with the burst acknowledge signal BACK.

At time T5, the AND gate 56 allows the three state buffer circuit 57 to enter the low impedance state in the presence of the phase 1 clock signal, and, accordingly, the address bits A3' of logic "0" level and A2' of logic "1" level are transferred from the incrementing circuit 55 to the latching circuit 54. The latching circuit 54 latches the address bits A3' and A2' at time T6 which in turn are transferred to the to the decoder circuit 58. With the incremented address bits, the decoder circuit 58 changes the bit string of the output signal in accordance with Table 1. Since the three state control signal STC remains in the active high voltage level, the output signal of the decoder circuit 58 is stored in the three state buffer circuits 59 to 62, thereby allowing the strobe signal ST1 to go up to the active low voltage level. However, the strobe signal ST0 is recovered to the inactive high voltage level. With the strobe signal ST1 of the active low voltage level, the static type random access memory device 22 is activated, so that a data word D22 is read out from the memory device 22 to the data bus 20, and the data word D22 is fetched by the microprocessor at time T7.

In the similar manner, the address bits A3' and A2' are incremented by one and, then, latched in the latching circuit at time T8. This results in that the strobe signal ST1 is recovered to the inactive high voltage level and the strobe signal ST2 goes up to the active low voltage level. With the strobe signal ST2, the static type random access memory device 23 is activated, and, for this reason, a data word D23 is read out to the data bus 20. The data word D23 is fetched by the microprocessor 16 at time T9. Since the strobe signal ST3 is shifted to the active low voltage level instead of the signal ST2 at time T10, a data word D is fetched by the microprocessor 16 at time T11.

As described hereinbefore, the clocked R-S flip flop circuit 45 enters the reset state at time T10, and the delay flip flop circuit 44 recovers the three state control signal STC to the inactive low voltage level at time T12. Then, the delay flip flop circuits 39 to 43 are shifted to the reset state, and the three state buffer circuit 59 to 62 enter the high impedance state, thereby terminating the burst transmission. After time T12, the microprocessor 16 can request another bus cycle and repeat the burst transmission.

If the microprocessor 16 requests a discrete access at time T20 and the data word fetched by the microprocessor 16 is stored in the cache memory 17, the hit signal HIT is produced at time T21. However, burst requesting signal BREQ remains in the inactive high voltage level, and, for this reason, no burst acknowledge signal BACK is supplied to the microprocessor 16. The three state control signal BCOS is supplied from the AND gate 46 to the three state buffer circuit 53 in the presence of the bus cycle signal BCYST. The latching signal ADC is supplied to the latching circuit 54 at time T22, so that the address bits A3 and A2 are latched into the latching circuit 54. Assuming now that the address bits A3 and A2 are logic "1" level and logic "0" level, respectively, the strobe signal ST2 is shifted to the active low voltage level, and, for this reason, the random access memory device 23 is activated for reading out the data word D23 stored therein. Since the data word D23 is transferred to the data bus 20, the microprocessor 16 fetches the data word D23 at time T23. The hit signal HIT of the active high voltage level and the burst request signal BREQ of the inactive low voltage level allow the AND gate 47 provides the high voltage level to the OR gate 52, so that the OR gate 52 shifts the reset signal BCR to the active high voltage level at time T22. This results in the low voltage level at the node BCY2 at time T23 which in turn allows the delay flip flop circuit 44 to shift the three state control signal STC to the inactive low voltage level at time T24. Thus, the cache memory controllor 1 causes the cache memory 17 to transfer the data word fetched by the microprocessor 16, and the bus cycle is completed at time T24.

Assuming now that no hit signal HIT takes place after shifting the bus cycle signal BCYST into the active low voltage level at time T30, the AND gates 48 does not produce the high voltage level, so that no three state control signal STC is supplied to the strobe signal producing circuit 14. This results in that no random access memory device is activated, and, accordingly, no data word is read out from the cache memory 17. The AND gate 51 produces the output signal of the high voltage level at time T31, and, accordingly, the delay flip flop circuit 43 allows the OR gate 52 to shift the reset signal BCR to the high voltage level at time T32. This results in that the node BYC2 is recovered to the low voltage level at time T33. As known in the art, whenever the data fetch by the microprocessor 16 is not hit, the controlling circuit 11 achieves a swapping operation between the cache memory 17 and the main memory (not shown) and, then, transfers the data word requested by the microprocessor 16.

Second embodiment

Figure 6:
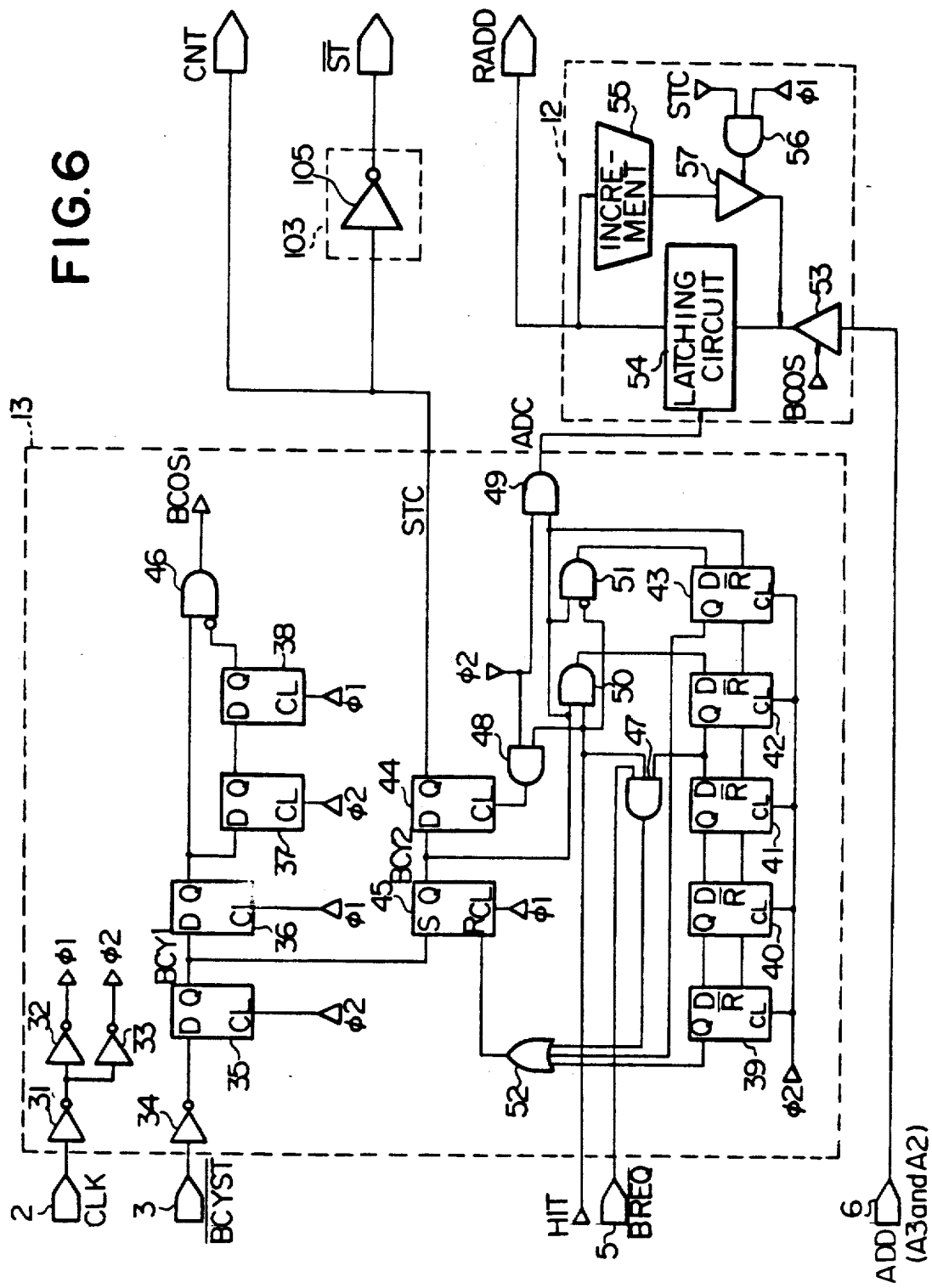
FIG. 6 is a block diagram showing the arrangement of an essential part of the cache memory controllor shown in FIG. 5.
Figure 8B:
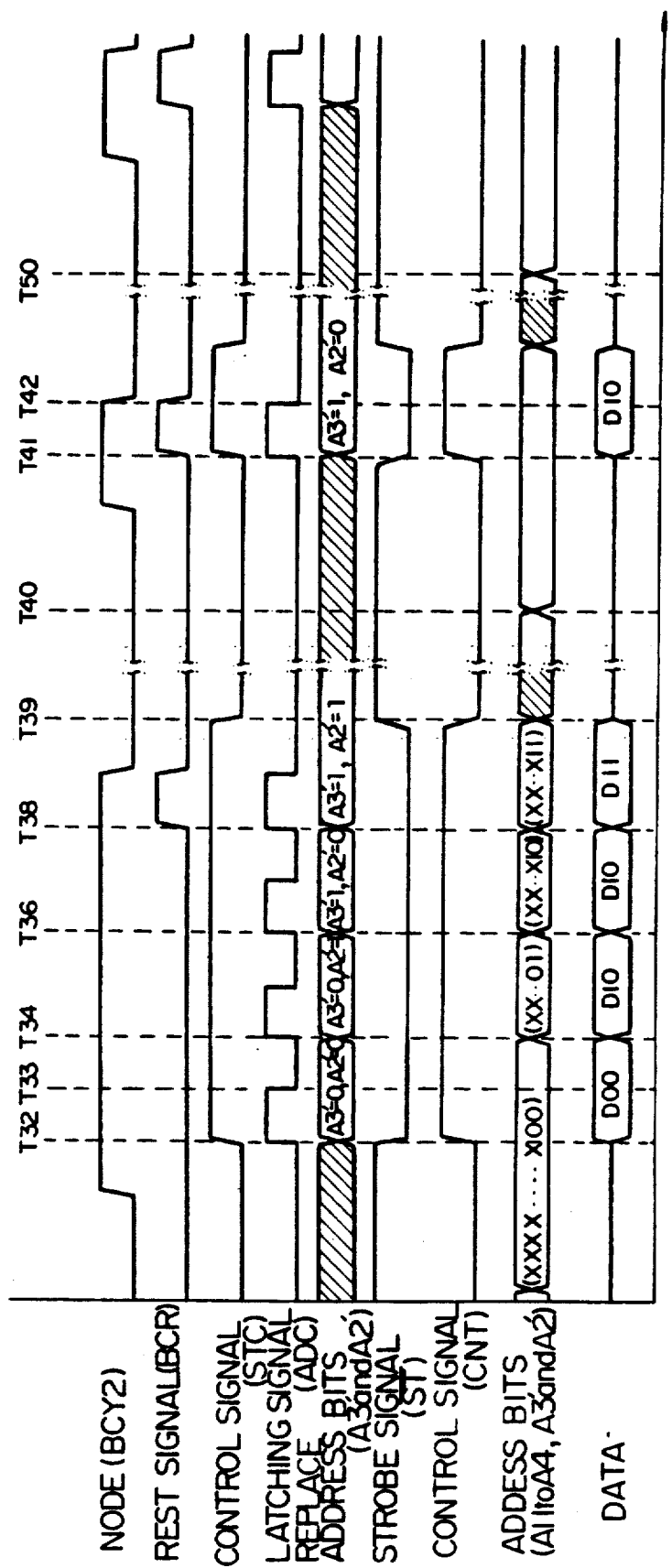

The circuit arrangement of another cache memory controllor 100 is illustrated in FIGS. 5 and 6 of the drawings, and another data processing system is built up with the cache memory controllor 100 in association with a microprocessor 101 as well as a cache memory 102 as shown in FIG. 7. Signals fed from the microprocessor 101 are similar to those from the microprocessor 16, so that like symbols are labeled to the signals shown in FIGS. 1 to 3. The cache memory controllor 100 is similar in circuit arrangement to the cache memory controllor shown in FIG. 1 with the expression of a strobe signal producing circuit 103, and, for this reason, like reference numerals designate the corresponding component blocks and elements without any detailed description.

The cache memory 102 is formed by a single block and associated with a multiplexer 104. The cache memory 102 is of the static random access memory, and a sequence of addresses is supplied to the cache memory 102 for every burst transmission mode of operation. For this reason, the strobe signal producing circuit is provided with an inverter circuit 105, and a single strobe signal ST of the active low voltage level is supplied to the cache memory 102 for activation thereof The three state control signal STC serves as a control signal CNT of the active high voltage level and is supplied to the multiplexer 104 for selection of a replace address signal RADD consisting of the address bits A3' and A2'. As described hereinbefore, the address generating circuit 12 increments the value represented by the low-order two bits A3 and A2, so that the address represented by the ten bits A11 to A4, A3' and A2' are increased in synchronization with the phase 1 clock signal.

In operation, if the bus cycle signal BCYST and the burst request signal BREQ are simultaneously shifted to the active low voltage level at time T30, the controlling circuit 11 checks the internal address table to see whether or not data words accessed are memorized in the cache memory 102. When the data words are stored in the cache memory 102, the hit signal HIT is supplied to the AND gate 15 for producing the bus acknowledge signal BACK of the active high voltage level at time T31. The bus cycle signal BCYST of the active low voltage level allows the timing generating circuit 13 to produce the control signal STC of the active high voltage level, and the control signal STC remains in the active high voltage level in the presence of the burst request signal BREQ of the active low voltage level. The three state control signal BCOS is produced in the presence of the bus cycle signal BCOS, and, accordingly, the address bits A3 and A2 are stored in the address generating circuit 12. The hit signal HIT is further supplied to the timing generating circuit 13 and allows the latching signal ADC to be supplied to the address generating circuit 12, so that the replace address bits A3' and A2' are transferred from the address generating circuit 12 to the multiplexer 104 at time T32. With the control signal CNT, the multiplexer 104 is transparent for the replace address bits A3' and A2', and the address bits A11 to A4, A3' and A2' are supplied to the cache memory 102. At time T32, the strobe signal producing circuit 103 yields the strobe signal ST of the active low voltage level which is supplied to the cache memory 102 as the chip enable signal CS. Then, a data word D00 is read out from the cache memory 102 to the data bus 20, and the microprocessor 101 fetches the data word D00 time T33.

Subsequently, the address generating circuit 12 increments the value represented by the address bits A3 and A2. Then, the replace address bits A3' and A2' represent an incremented value, and a data word D10 is read out from the cache memory 102 to the data bus 20 at time T34. In the similar manner, data words D10 and D11 are read out from the cache memory 102 at times T36 and T38, respectively. At time T39, the strobe signal ST is recovered to the inactive high voltage level, and, accordingly, the burst transmission is completed.

However, if no burst request signal BREQ is supplied to the cache memory controllor 100 in the presence of the bus cycle signal BCYST of the active low voltage level, the cache memory controllor 100 allows the data word D10 to be read out at time T41, and the microprocessor 101 fetches the data word D10. However, no further data fetch takes place due to the discrete access in the absence of the burst request signal BREQ.

In the case where no data word accesses is memorized in the cache memory 102 upon access at time T50, the cache memory controllor 100 does not produce any hit signal and establishes the swapping mode of operation so as to carry out the swapping operation between the cache memory 102 and the main memory.

Third embodiment

Turning to FIG. 9, a part of a timing signal generating circuit is illustrated. The timing signal generating circuit shown in FIG. 9 is provided for a burst transmission where the number of data words transferred is variable. In FIG. 9, like reference numerals are used for designating the corresponding component elements of the cache memory controllor 1. The delay flip flop circuits 39 to 41 are accompanied with OR gates 201, 202 and 203, respectively, and AND gates 204, 205 and 206 are coupled to one input nodes of the OR gates 201, 202 and 203 for allowing the OR gates 201 to 203 to become transparent depending on a data bits stored in a registor 207. Namely, the data bits stored in the registor 207 is indicative of the number of data words transferred in the burst transmission mode of operation and decoded by a decoder circuit 208 for selective activation of the AND gates 204, 205 and 206. The relationship between the stored data bits and the decoded bits D1, D2 and D3 is indicated in Table 2.

TABLE 2

| Stored data bits | D1 | D2 | D3 |
|---|---|---|---|
| 0 1 | 1 | 0 | 0 |
| 1 0 | 0 | 1 | 0 |
| 1 1 | 0 | 0 | 1 |
| 0 0 | 0 | 0 | 0 |

When the data bits are (1 0) or indicative of value 2, the decoded bits D1 to D3 are of logic "1" level, the AND gate 204 to 206 are (0 1 0), and the reset signal BCR is shifted to logic "1" level at time T6 of FIGS. 4A and 4B. For this reason, the three state control signal STC is recovered to the low voltage level at time T8. This results in that only two data words are successively fetched by the microprocessor 16.

Although particular embodiments of the present invention have been shown and described, it will be obvious to those skilled in the art that various changes and modifications may be made without departing from the spirit and scope of the present invention. For example, four data words are successively fetched by the microprocessor in the burst transmission mode of operation, however, more than four data words may be transferred from a cache memory in the burst transmission mode.

What is claimed is:

1. A cache memory controllor used in a data processing system including a cache memory provided with a plurality of memory devices, a main memory and a data processing unit providing an external address partially to the cache memory and partly to the cache memory controllor, said cache memory controllor being selectively shifted in response to request signals from the data processing unit, in a burst transmission mode and a discrete transmission mode, comprising:

(a) a controlling circuit supplied with high-order bits of said external address signal fed from said data processing unit and producing a hit signal when data words stored in respective addresses partially represented by the high-order bits are stored in said cache memory, said controlling circuit further being shifted into a swapping mode so as to swap data words between said main memory and said cache memory if said data words are not stored in the cache memory;

(b) an address generating circuit for storing low-order bits of said external address signal in the presence of a first activation signal and producing internal address bits indicative of one of said memory devices in said discrete transmission mode, means in said address generating circuit for incrementing said internal address bits in the presence of a second activation signal in said burst transmission mode so as to sequentially indicate said memory chips;

(c) a strobe signal producing circuit responsive to said second activation signal and producing a single strobe signal on the basis of said internal address bits received from the address generating circuit for activating one of said memory devices in said discrete transmission mode, said strobe signal producing circuit sequentially producing strobe signals on the basis of said internal address bits incremented in value in the presence of said second activation signal for activating said memory devices in succession; and (d) a timing generating circuit producing said first activation signal in the presence of said hit signal and a bus cycle signal, said timing generating circuit further producing said second activation signal in the presence of said bus cycle signal, said second activation signal being maintained for a predetermined time period in the presence of a request signal for said burst transmission mode fed from said data processing unit for allowing said internal address bits to be incremented in value.

2. A cache memory controllor as set forth in claim 1, in which said address generating circuit comprises a three state buffer circuit responsive to a first bit of said first activation signal for storing the low-order bits of said external address signal, a latching circuit responsive to a second bit of the first activation signal and operative to produce said internal address bits which are supplied to said strobe signal producing circuit, and an incrementing circuit supplied with the internal address bits for incrementing in value in the presence of said second activation signal and in which said internal address bits are supplied from said incrementing circuit to said latching circuit.

3. A cache memory controllor as set forth in claim 2, in which said strobe signal producing circuit comprises a decoder circuit supplied with said internal address bits, and a plurality of three state buffer circuits coupled in parallel to the decoder circuit and responsive to said second activation signal for transferring said strobe signal or said strobe signals to said cache memory.

4. A cache memory controllor as set forth in claim 3, in which said timing generating circuit comprises a complementary clock signal producing circuit for a phase 1 clock signal and a phase 2 clock signal, a first combination of an inverter circuit, flip-flop circuits and an AND gate responsive to said bus cycle signal for producing the first bit of said first activation signal, a second combination of a flip-flop circuit and an AND gate responsive to the bus cycle signal and phase 2 clock signal for producing the second bit of the first activation signal, a third combination of flip-flop circuits and an AND gate responsive to the bus cycle signal, said hit signal and the phase 2 clock signal for producing said second activation signal, and a timer circuit responsive to said request signal for said burst transmission mode for maintaining said second activation signal for said predetermined time period in said burst transmission mode, said timer circuit further operative to terminate said second activation signal in said discrete transmission mode after said single strobe signal is produced 5. A cache memory controllor as set forth in claim 4, in which said timer circuit comprises a first AND gate producing a first AND signal in the presence of said bus cycle signal and said hit signal, a second AND gate producing a second AND signal in the presence of the bus cycle signal and the hit signal, a first flip-flop circuit responsive to the second AND signal and said phase 2 clock signal for producing a first FF signal, second, third, fourth and fifth flip-flop circuits coupled in cascade and responsive to the first AND signal and the phase 2 clock signal for producing a fifth FF signal, said second flip-flop circuit being responsive to said first AND signal and the phase 2 clock signal for producing a second FF signal, a third AND gate responsive to the second FF signal, the hit signal and the request signal for producing a third AND signal, and a first OR gate for responsive to the first FF signal, the third AND signal or the fifth FF signal for producing a reset signal supplied to said second and third combinations.

6. A cache memory controllor as set forth in claim 5, in which said timer circuit further comprises a resistor for storing a data signal representative of the predetermined time period, a decoder circuit for decoding the data signal stored in the registor, second, third and fourth OR gates associated with said third, fourth and fifth flip-flop circuits and coupled at first input nodes thereof to said second, third and fourth flip-flop circuits, respectively, and first, second and third AND gates supplied with said hit signal and coupled to second input nodes thereof to said first, second and third AND gates, respectively.

7. A cache memory controllor used in a data processing system 2 including a cache memory provided with a plurality of memory devices, a main memory and a data processing unit providing an external address partially to the cache memory and partly to the cache memory controllor, said cache memory controllor being selectively shifted in response to request signals from the data processing unit, in a burst transmission mode and a discrete transmission mode, comprising:

(a) a controlling circuit supplied with high-order bits of said external address signal fed from said data processing unit and producing a hit signal when data words stored in respective addresses partially represented by the high-order bits are stored in said cache memory, said controlling circuit further being shifted into a swapping mode so as to swap data words between said main memory and said cache memory if said data words are not stored in the cache memory;

(b) an address generating circuit for storing low-order bits of said external address signal in the presence of a first activation signal and producing internal address bits indicative of one of said address together with a part of said external address signal signal fed to said cache memory in said discrete transmission mode, means in said address generating circuit for incrementing said internal address bits in the presence of a second activation signal in said burst transmission mode so as to sequentially indicate said addresses together with the part of said external address signal;

(c) a strobe signal producing circuit responsive to said second activation signal and producing a strobe signal in the presence of a bus cycle signal for reading out one of said data words in said discrete transmission mode, said strobe signal producing circuit maintaining said strobe signal on the basis of said internal address bits incremented in value received from the address generating circuit in the presence of said second activation signal for reading out said data words in succession; and (d) a timing generating circuit producing said first activation signal in the presence of said hit signal and a bus cycle signal, said timing generating circuit further producing said second activation signal in the presence of said bus cycle signal, said second activation signal being maintained for a predetermined time period in the presence of a request signal for said burst transmission mode fed from said data processing unit for allowing said internal address bits to be incremented in value.

8. A cache memory controllor as set forth in claim 7, in which said address generating circuit comprises a three state buffer circuit responsive to a first bit of said first activation signal for storing the low-order bits of said external address signal, a latching circuit responsive to a second bit of the first activation signal and operative to produce said internal address bits which are supplied to said strobe signal producing circuit, and an incrementing circuit supplied with the internal address bits for incrementing in value in the presence of said second activation signal and in which said internal address bits are supplied from said incrementing circuit to said latching circuit.

9. A cache memory controllor as set forth in claim 8, in which said strobe signal producing circuit comprises a decoder circuit supplied with said internal address bits, and a plurality of three state buffer circuits coupled in parallel to the decoder circuit and responsive to said second activation signal for transferring said strobe signal or said strobe signals to said cache memory.

10. A cache memory controllor as set forth in claim 9, in which said timing generating circuit comprises a complementary clock signal producing circuit for a phase 1 clock signal and a phase 2 clock signal, a first combination of an inverter circuit, flip-flop circuits and an AND gate responsive to said bus cycle signal for producing the first bit of said first activation signal, a second combination of a flip-flop circuit and an AND gate responsive to the bus cycle signal and phase 2 clock signal for producing the second bit of the first activation signal, a third combination of flip-flop circuits and an AND gate responsive to the bus cycle signal, said hit signal and the phase 2 clock signal for producing said second activation signal, and a timer circuit responsive to said request signal for said burst transmission mode for maintaining said second activation signal for said predetermined time period in said burst transmission mode, said timer circuit further operative to terminate said second activation signal in said discrete transmission mode after said single strobe signal is produced.

11. A cache memory controllor as set forth in claim 10, in which said timer circuit comprises a first AND gate producing a first AND signal in the presence of said bus cycle signal and said hit signal, a second AND gate producing a second AND signal in the presence of the bus cycle signal and the hit signal, a first flip-flop circuit responsive to the second AND signal and said phase 2 clock signal for producing a first FF signal, second, third, fourth and fifth flip-flop circuits coupled in cascade and responsive to the first AND signal and the phase 2 clock signal for producing a fifth FF signal, said second flip-flop circuit being responsive to said first AND signal and the phase 2 clock signal for producing a second FF signal, a third AND gate responsive to the second FF signal, the hit signal and the request signal for producing a third AND signal, and a first OR gate for responsive to the first FF signal, the third AND signal or the fifth FF signal for producing a reset signal supplied to said second and third combinations.

* * * * *